(12) United States Patent
Yang et al.

(10) Patent No.: US 10,073,894 B2
(45) Date of Patent: Sep. 11, 2018

(54) MINING FOR STATISTICAL ENUMERATED TYPE

(71) Applicant: Microsoft Technology Licensing, LLC, Redmond, WA (US)

(72) Inventors: Jinlin Yang, Redmond, WA (US); Haibin Xie, Redmond, WA (US); Peter Chapman, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 308 days.

(21) Appl. No.: 14/939,855

(22) Filed: Nov. 12, 2015

(65) Prior Publication Data

US 2016/0063069 A1    Mar. 3, 2016

Related U.S. Application Data

(63) Continuation of application No. 13/715,300, filed on Dec. 14, 2012, now Pat. No. 9,213,743.

(51) Int. Cl.
*G06F 17/30* (2006.01)

(52) U.S. Cl.
CPC .. *G06F 17/30539* (2013.01); *G06F 17/30516* (2013.01); *G06F 17/30598* (2013.01)

(58) Field of Classification Search
CPC ......... G06F 17/30516; G06F 17/30598; G06F 17/30539; G06F 17/30601; G06F 17/30705; G06F 17/30707; G06F 17/3071
USPC ........ 707/600, 688, 756, 803; 717/124, 127, 717/128, 130, 131; 709/224
See application file for complete search history.

(56) References Cited

U.S. PATENT DOCUMENTS

| | | | | |
|---|---|---|---|---|
| 7,379,999 | B1* | 5/2008 | Zhou | G06F 11/3476 709/224 |
| 7,788,109 | B2 | 8/2010 | Jakobson et al. | |
| 8,041,996 | B2 | 10/2011 | Rathunde et al. | |
| 8,060,889 | B2 | 11/2011 | Sim-Tang | |
| 8,099,452 | B2 | 1/2012 | Chkodrov et al. | |
| 8,463,811 | B2* | 6/2013 | Lakshmanan | G06F 17/30303 707/696 |
| 2002/0156601 | A1 | 10/2002 | Tu et al. | |
| 2004/0205038 | A1* | 10/2004 | Lee | G06K 9/342 706/47 |
| 2007/0140301 | A1* | 6/2007 | Kailash | H04L 43/024 370/498 |

(Continued)

OTHER PUBLICATIONS

"The Event Analysis and Retention Dilemma", Retrieved at <<http://www.sensage.com/sites/default/files/sensage_event_analysis_dilemma.pdf>>, Retrieved Date Oct. 9, 2012, pp. 17.

(Continued)

*Primary Examiner* — Hares Jami

(57) ABSTRACT

Event stream attributes are analyzed to determine whether the attributes are of a statistical enumerated type, or, in other words, whether the attributes comprise statistically fixed sets of unique values, for instance. The analysis can involve determining a magnitude of change to a set of unique attribute values. In one instance, such a determination can be performed as a function of a number, or count, of unique values. Further, event stream processing can be performed dynamically, for instance, by partitioning data into time intervals and processing the intervals incrementally.

20 Claims, 9 Drawing Sheets

(56) References Cited

U.S. PATENT DOCUMENTS

| | | | |
|---|---|---|---|
| 2008/0016412 A1* | 1/2008 | White | G06F 11/3409 |
| | | | 714/48 |
| 2009/0125550 A1 | 5/2009 | Barga et al. | |
| 2011/0004935 A1* | 1/2011 | Moffie | G06F 21/53 |
| | | | 726/23 |
| 2011/0040874 A1* | 2/2011 | Dugatkin | H04L 41/00 |
| | | | 709/224 |
| 2012/0072581 A1 | 3/2012 | Tung et al. | |
| 2013/0091168 A1* | 4/2013 | Bhave | G06F 17/30551 |
| | | | 707/771 |
| 2013/0198565 A1* | 8/2013 | Mancoridis | G06F 11/008 |
| | | | 714/26 |

OTHER PUBLICATIONS

Copps, Brian, "Monitoring and Diagnostic Guidance for Windows Azure hosted Applications", Retrieved at http://docplayer.net/16182516-Monitoring-and-diagnostic-guidance-for-windows-azure-hosted-applications.html.
"Non Final Office Action Issued in U.S. Appl. No. 13/715,300", dated May 23, 2014, 13 Pages.
"Final Office Action Issued in U.S. Appl. No. 13/715,300", dated Jan. 15, 2015, 15 Pages.
"Notice of Allowance Issued in U.S. Appl. No. 13/715,300", dated Aug. 11, 2015, 14 Pages.
U.S. Appl. No. 13/715,300, filed Dec. 14, 2012, Jinlin Yang et al.

* cited by examiner

MINING FOR STATISTICAL ENUMERATED TYPE

CROSS-REFERENCE TO RELATED APPLICATION

This application is a continuation of U.S. application Ser. No. 13/715,300 filed Dec. 14, 2012, the entirety of which is incorporated herein by reference.

BACKGROUND

A time-based event stream is comprised of a series of events ordered in terms of time. An event is a message including one or more attributes. An attribute can be a string or numeric type, for instance. Software application monitoring and/or diagnostic tools typically generate time-based event streams to facilitate application debugging. For example, performance counter data collected for an application can be supplied as a time-based stream, and each event can include attributes such as time stamp, application name, counter name, and counter value. In sum, the event stream provides a sequence of messages over time that describes the behavior of an application.

The sheer quantity of events typically comprising a stream makes locating pertinent information a time consuming process. For instance, in a complex distributed system thousands of events can be produced. Furthermore, absent knowledge of a software application, for example originating from a specification or other documentation, it is difficult to formulate meaningful queries to explore the events effectively. Event streams also can be dynamically reconfigured further complicating matters.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to mining for statistical enumerated type. Attribute values of a time-based event stream are analyzed to determine a magnitude of change associated with the values. Attributes can be assigned a category or class as a function of the magnitude of change. For example, an attribute can be assigned to a class associated with a statistical enumerated type or statistically fixed set of unique values, if there is little or no change in a set of unique values comprising the attribute. In accordance with one aspect, the magnitude of change can be measured as a function of number, or count, of unique values acquired over time. In accordance with another aspect, the analysis of attribute values can differentiate between an occasional change, associated with dynamic reconfiguration, for example, and randomness. According to yet another aspect, event streams can be processed dynamically, for instance by partitioning data and processing partitions incrementally.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

In the context of large amounts of data, such as data afforded by time-based event streams, it is desirable to enable data exploration in an effective manner. In furtherance thereof, data can be divided into categories or classes based on data characteristics. Subsequent data processing can exploit such data categorization or classification to aid exploration of data.

One way to categorize data is based on whether the data comprises a fixed set of unique values. For instance, a time-based event stream attribute that comprises a fixed set of unique values can be classified differently from an attribute that that can comprise substantially any value. By way of example, suppose data is collected from five different performance counters of an application. The counter name can be one of five unique values, which is a fixed set. The counter value, however, could have a different value each time and is thus not a fixed set. In other words, the counter name remains relatively unchanged while the counter value continues to change.

Details below are generally directed toward mining for statistical enumerated type. More specifically, event stream attributes can be analyzed to determine whether they comprise a statistically fixed set of unique values. Here, the term statistically indicates that an attribute need not comprise a permanently fixed set of values over its life, as is the case with a conventional enumerated type, but rather the set of values rarely changes. This addresses real world systems that allow dynamical reconfiguration of events streams. Hence, a change can be introduced, but before and after the change, the set of values is fixed, albeit with different values. In other words, the set of values stabilizes after a change over time. In accordance with one embodiment, an attribute of a statistical enumerated type can be identified as a function of the number of unique values observed for the attribute over time. Further, mining for statistical enumerated type can be performed dynamically in substantially real time, for instance by partitioning data into fixed time intervals and processing data incrementally.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
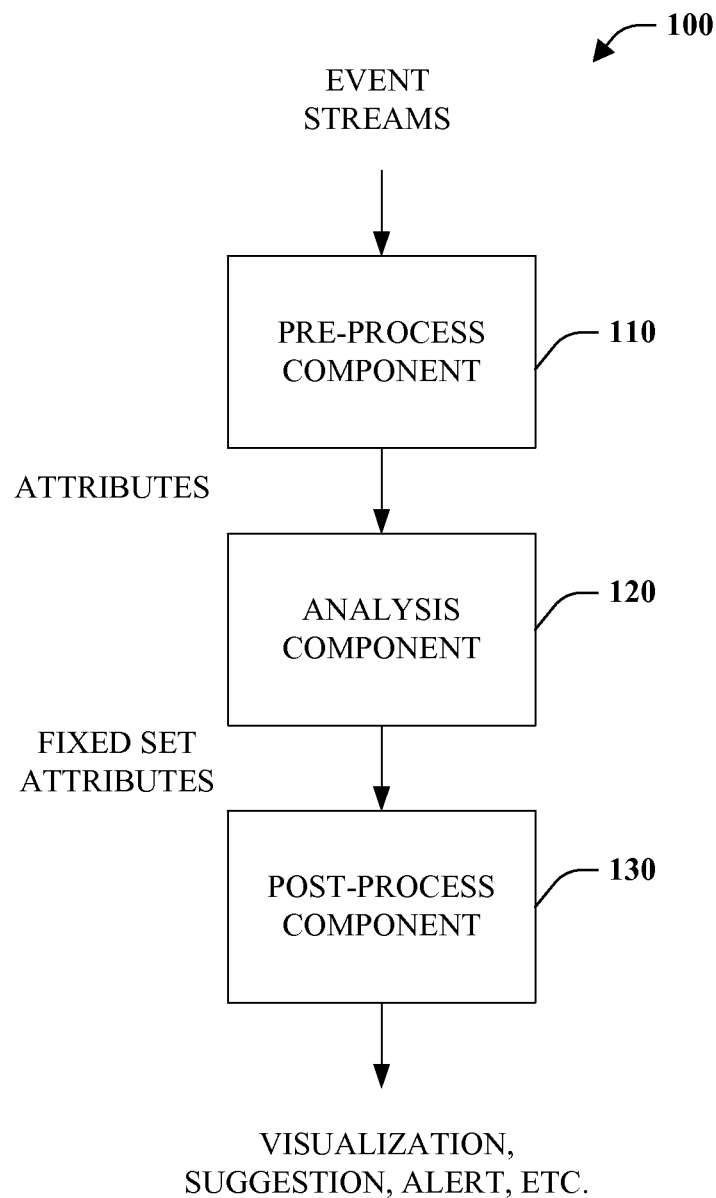
FIG. 1 is a block diagram of a time-based event stream processing system.

Referring initially to FIG. 1, a time-based event stream processing system 100 is illustrated. The system 100 includes pre-process component 110, analysis component 120, and post-process component 130. The pre-process component 110 accepts time-based event streams as input. A time-based event stream (also referred herein as simply an event stream) is comprised of events that are ordered in terms of time. An event is a message that includes one or more attributes, wherein an attribute can be a string or numeric type, for example. After processing, the pre-process component 110 outputs event stream attributes.

The analysis component 120 analyzes the attributes in an attempt to discover attributes that comprise a statistically fixed set of unique values. Stated differently, the analysis component 120 is configured to mine attributes for statistical enumerated types. As a result, attributes can be classified as an enumerated type (a.k.a. Enum) or fixed set of unique values, or non-enumerated type (a.k.a. Non-Enum) or non-fixed set of unique values.

The terms statistically and statistical indicate that, although it can, an attribute need not comprise a permanently fixed set of unique values over its life, as is the case with a conventional enumerated type. Rather the set of values can change on occasion. This addresses real world systems that allow dynamical reconfiguration of events streams. Here, a change can be introduced, but before and after the change, the set of values is fixed, albeit with different values By way of example, consider an scenario in which five performance counters are initially monitored, and subsequently during reconfiguration one counter is removed and two new performance counters added instead. Hence, the counter name attribute of an event stream does not comprise an absolutely fixed set of unique values. However, the time before and after the configuration change, the number of unique counter names is fixed. This is referred to as being statistically fixed or of a statistical enumerated type.

When analyzing an attribute the analysis component 120 can seek to determine a magnitude of change associated with a set of unique values. Attributes can subsequently be assigned a category or class as a function of the magnitude of change. By way of example, and not limitation, if there is a small change, or no change at all, in values comprising an attribute as compared to a predetermined change threshold, the attribute can be classified as fixed. Otherwise, if there is a large change in attribute values with respect to a predetermined change threshold, the attributed can be classified as non-fixed or variable. As will be described later herein, in one embodiment, the number, or count, of unique values of an attribute can be used as a measure of the magnitude of change over time.

The post-process component 130 can be configured to execute various techniques to aid data exploration based on an attribute category or class. For example, the post-process component 130 can provide query suggestions. Additionally or alternatively, the post-process component 130 can visualize data based on whether or not an attribute is a statistically fixed set of values, for instance.

Figure 2:
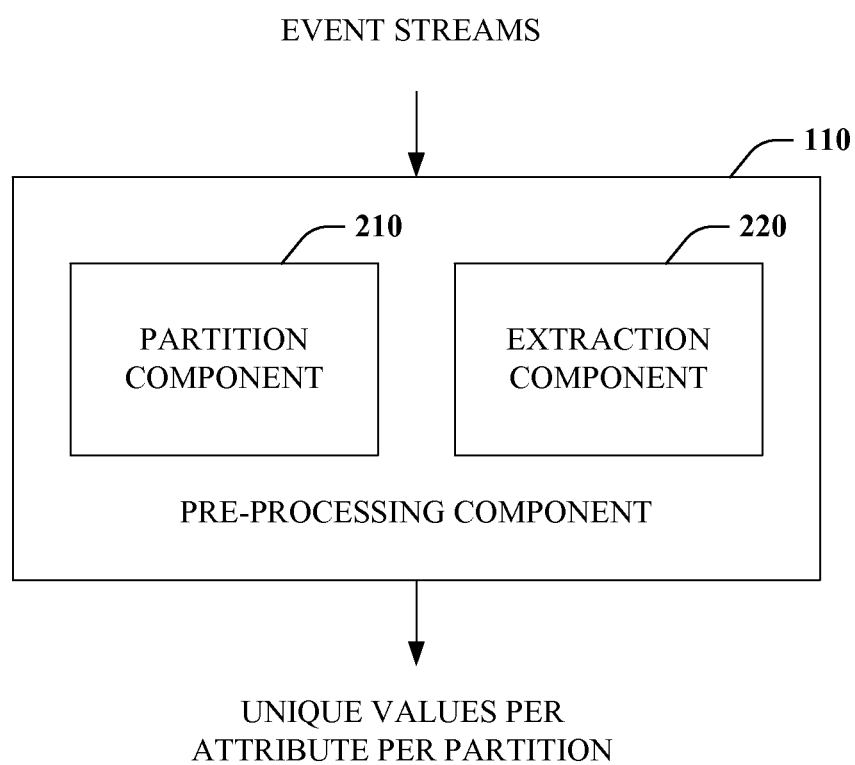
FIG. 2 is a block diagram of a representative pre-process component.

FIG. 2 depicts a representative pre-process component 110 in further detail. The pre-process component comprises partition component 210 and extraction component 220. The representative pre-process component 110 can accept event streams as input and output unique values per attribute per partition in accordance with one embodiment.

The partition component 210 is configured to partition an event stream into intervals as a function of time. For instance, an event stream can be partitioned based on time stamp into chunks or segments that correspond to "N"-minute intervals. The default value of "N" could be five. However, "N" could be adjusted to a larger value if the event stream is populated less frequently. For example, if an event stream includes data with time stamp on an hour boundary (data provided every sixty minutes), "N" can be set to sixty.

The extraction component 220 is configured to extract unique values comprising an attribute. In one embodiment, given an event segment for an "N"-minute interval, the extraction component 220 can execute a "Distinct" operation on each attribute to identify its unique values during the "N"-minute interval. The unique values of an attribute for a segment are also referred to herein as a sample. By way of example, if for counter name values "A, B, C, A, B, C" are observed during an interval, there are six values but the extraction component 220 can identify three as unique, namely "A," "B," and "C." In other words, the extraction component 220 can identify distinct values and ignore duplicates.

Figure 3:
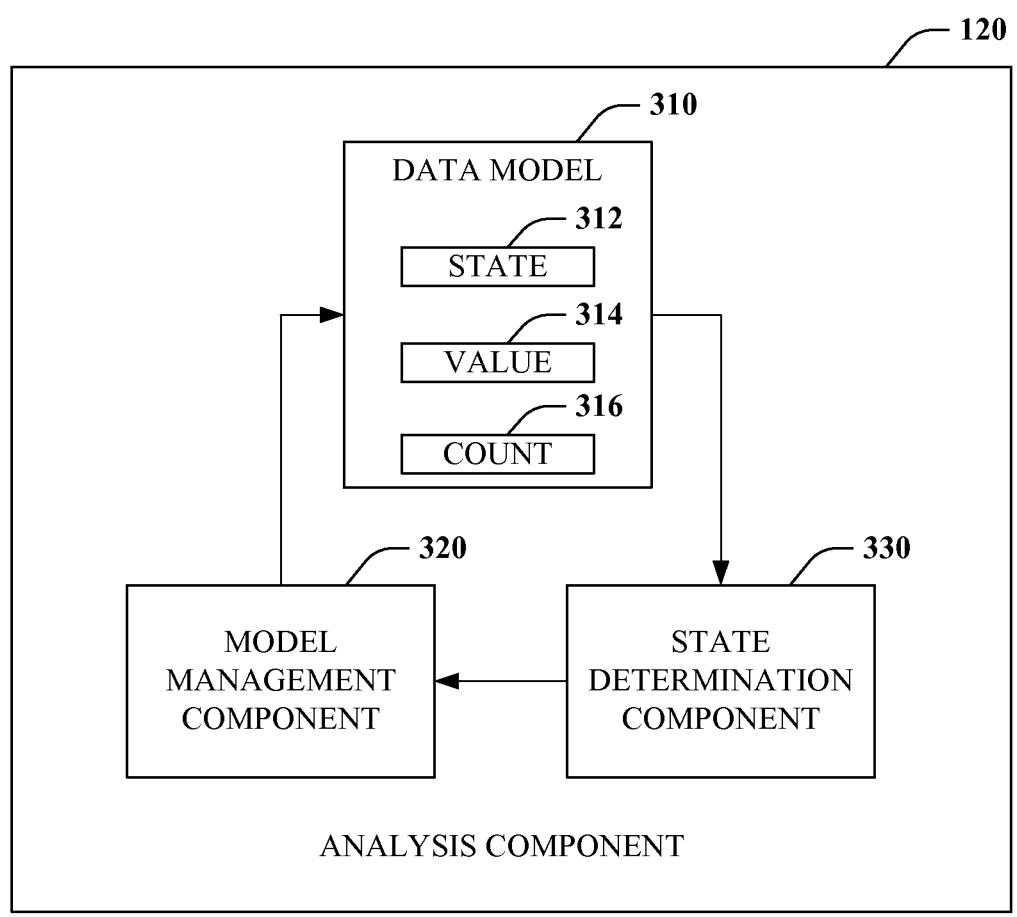
FIG. 3 is a block diagram of a representative analysis component.

FIG. 3 illustrates a representative analysis component 120. As previously mentioned, the analysis component 120 can be configured to mine event streams for attributes that comprise a statistically fixed set of values or are of statistical enumerated type. The analysis component 120 can employ a historical data model 310 comprising state field 312, value field 314, and count field 316 for each attribute. The state field 312 represents the current state, or assigned category or class, of an attribute. In one embodiment, for instance, there could be three states, "Unknown," "Enum," and "Non-Enum." The value field 314 records past values (PV) of unique values of an attribute observed thus far. The number of unique values of an attribute observed thus far is referred to as count (C). The count field 316 captures past counts (PC) comprising counts at each observed sample point.

Model management component 320 can be configured to build and maintain the historical data model 310. For instance, the model management component 320 can compute and populate fields with values for each interval. By way of example, and not limitation, suppose a sample at interval "i" is observed comprising attribute values "V(i)." The model management component 320 can compute past values "PV(i)" as "PV(i)=Union(PV(i−1), V(i)," where "Union" is a conventional set union operation. Further, the model management component 320 can compute the past count in accordance with the following equations: "PC(i)=C(0), C(1), . . . C(i)=PC(i−1), Count(PV(i))," where "C(i)=Count(PV(i))" and "Count" returns the number of elements in a set. In accordance with one embodiment, the model management component 320 can be configured to update or reset the historical data model 310, as will be described further hereinafter.

State determination component 330 is configured to identify the state of an attribute as a function of at least the past state and the number of unique values per interval for an attribute. The number of unique values can be employed as a measure of uniqueness over time. In accordance with one embodiment, a threshold test can be utilized to determine whether an attribute comprises a statistically fixed set of unique values or, in other words, is a statistical enumerated type. Given a sample for an interval "i," the historical data model 310, past value "PV(i)," and past count "PC(i)" can be computed as follows:

$$PV(i)=\text{Union}(PV(i-1),V(i))$$

$$PC(i)=PC(i-1),\text{Count}(PV(i))$$

The state determination component 330 can compute mean, mean standard deviation, and percent with respect to the number of unique values as follows, supposing "PC(m)" includes "m" counts, "$X_1, X_2 \ldots X_m$."

$$\text{mean}=(X_1+X_2+\ldots+X_m)/m$$

$$\text{mean standard deviation}=\text{SQRT}(((X_1-\text{mean})^2+(X_2-\text{mean})^2+\ldots+(X_m-\text{mean})^2)/m)$$

$$\text{percent}=\text{mean standard deviation}/\text{mean}$$

Mean standard deviation captures the variance in the past counts, whereas percent normalizes the variance according to the mean of the past counts.

In accordance with one embodiment, the threshold test can be expresses as the following compound Boolean expression:

$$\text{mean standard deviation}<=K \| \text{percent}<L$$

The test can be passed if the expression is true and failed otherwise, where "K" and "L" are two parameters that can be tuned. It has been determined by experiment that setting "K" to "10.0" and "L" to "0.05" performs reasonably well for monitoring or diagnostic event streams. Of course, other settings may work equally well or better in this domain or other domains.

The Boolean expression captures both the absolute variance (the first predicate: "mean standard deviation<=K") and the relative variance in the counts (the second predicate: "percent<L"). When both variances are big, an attribute can be declared a "Non-Enum" or non-fixed set of unique values. Considering the absolute variance instead of just the relative variance is significant because the absolute variance in past counts could be quite small even though the relative variance is big. For example, suppose the past counts are "1, 1, 1, 2, 2, 2," the mean is "1.5," mean standard deviation is "0.5," percent is "0.33." Here, if "percent<L" with L=0.05 is the lone test, the data would fail the test. However, it is clear that the data is an "Enum" or comprises a fixed set of unique values, because the count remains at "2." Note also that the threshold test provides the ability to differentiate occasional change from randomness and therefore enables handling of dynamic configuration changes.

The model management component 320 is configured to update as well as reset the value field 314 and the count field 316 of the historical data model 310. Given the historical data model 310 of an attribute and a new sample (e.g., unique values of the attribute for an "N"-minute interval), the model management component 320 can first determine whether the number of samples is lower than a predetermined minimum. By way of example, and not limitation, the minimum number of samples can be set to "24," such that if "N" were set to "5," at least two hours of data would be necessitated by the condition. If the number of samples is below the minimum, the model management component 320 can update the model as follows:

$$PV(i)=\text{Union}(PV(i-1),V(i))$$

$$PC(i)=PC(i-1),\text{Count}(PV(i))$$

If the sample count is more than the minimum, the model management component 320 can solicit results of a threshold test performed by the state determination component 330. If the data passes the threshold test, the model management component 320 can update the value field 314 and the count field 316 as described above. If the data fails the threshold test, the model management component 320 can reset the value field 314 and count field 316 as follows:

$$PV(i)=\{\ \}$$

$$PC(i)=\{\ \}$$

Figure 4:
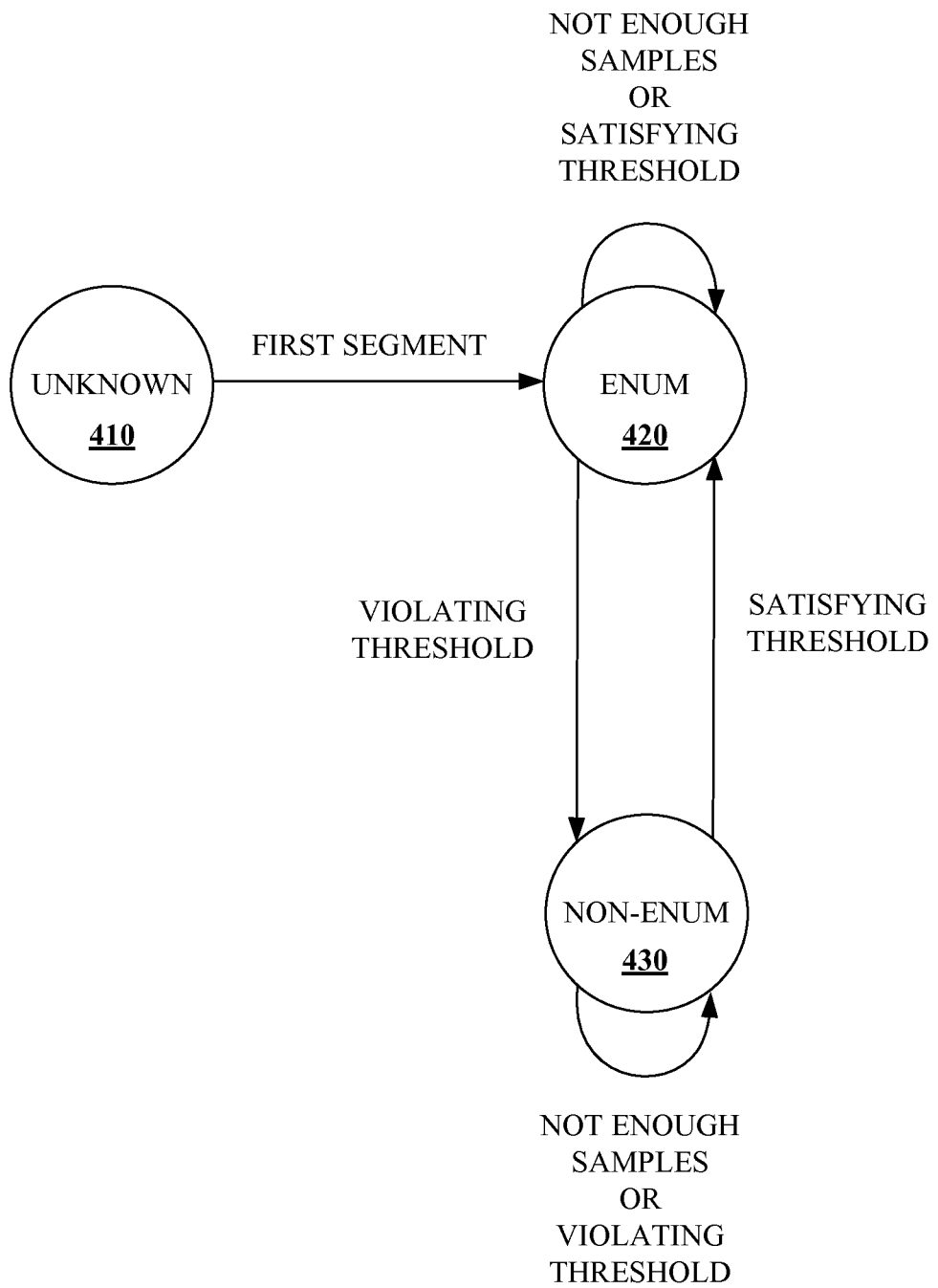
FIG. 4 illustrates a sample state machine associated with transitioning attribute state.

Turning attention to FIG. 4, a sample state machine is illustrated that describes functionality that can be employed by the state determination component 330. Before the first time an attribute is processed, that attribute's state is "Unknown" 410. The first time an attribute is processed (when a first segment of data is received), the attribute's state can be set to "Enum" 420 indicative of a statistical enumerated type or statistically fixed set of unique values. In other words, attributes can start or default to an "Enum" 420. An attribute's state can remain as "Enum" 420 as long as there are not enough samples to satisfy a predetermined minimum threshold or the previously described threshold test is satisfied. If the data fails the previously described threshold test, the attribute's state can be transitioned to "Non-Enum" 430 indicating that the attribute is a non-enumerated type or non-fixed set of unique values. Upon transitioning, from "Enum" 420 to "Non-Enum" 430, the model management component 320 can reset the value field 314 and count field 316 as previously described. This provides an opportunity for an attribute whose number of unique values stabilizes after a change. The attribute's state remains as "Non-Enum" 430 if there are fewer samples than a predetermined minimum threshold (due to the reset) or the data violates the threshold test. If the data does pass the threshold test, the state can transition back to "Enum" 420 and the process continues. The state determination component 330 can instruct the model management component 320 to update the state field 312 upon a transition or perform the update operation itself.

Returning to FIG. 1, the post-process component 130 can be configured to aid data exploration based on an assigned attribute category or class in a variety of ways. In a first embodiment, for example, the post-process component can be configured to visually distinguish on a user interface attributes that comprise a statistically fixed number of unique values and those that do not. In a second embodiment, the post-process component 130 can be configured to provide suggestions to facilitate query construction. For instance, those attributes that are of a statistical enumerated type or, in other words, comprise a statistically fixed set of unique values can be provided as suggestions. This is useful in that currently, absent specific knowledge originating from documentation, for example, it is difficult to formulate meaningful queries to explore the events effectively. Event streams also can be dynamically reconfigured further complicating matters. In yet another embodiment, the post-process component 130 can implement an alert functionality that could employ statistically enumerated types in detecting problems. For instance, if in the past data was rarely changing and suddenly there is a change, this could indicate that something is wrong.

In accordance with embodiment, the system 100 can operate over event streams generated by software application monitoring and/or diagnostic tools to facilitate application debugging. However, the claimed subject matter is not so limited, as aspects of this disclosure are applicable to data provided in order of time.

Further, the system 100 or portions thereof can operate dynamically in substantially real time. For example, the analysis component 120 can operate on the fly to identify attributes that are of a statistical enumerated type. Of course, the claimed subject matter is not so limited. In fact, aspects of this disclosure can be applied to a fixed set of data.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the analysis component 120 can employ such mechanisms to determine or infer that an attribute is or is not of a statistical enumerated type or does or does not comprise a statistically fixed set of unique values.

In view of the exemplary systems described supra, methodologies that may be implemented in accordance with the disclosed subject matter will be better appreciated with reference to the flow charts of FIGS. 5-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 5:
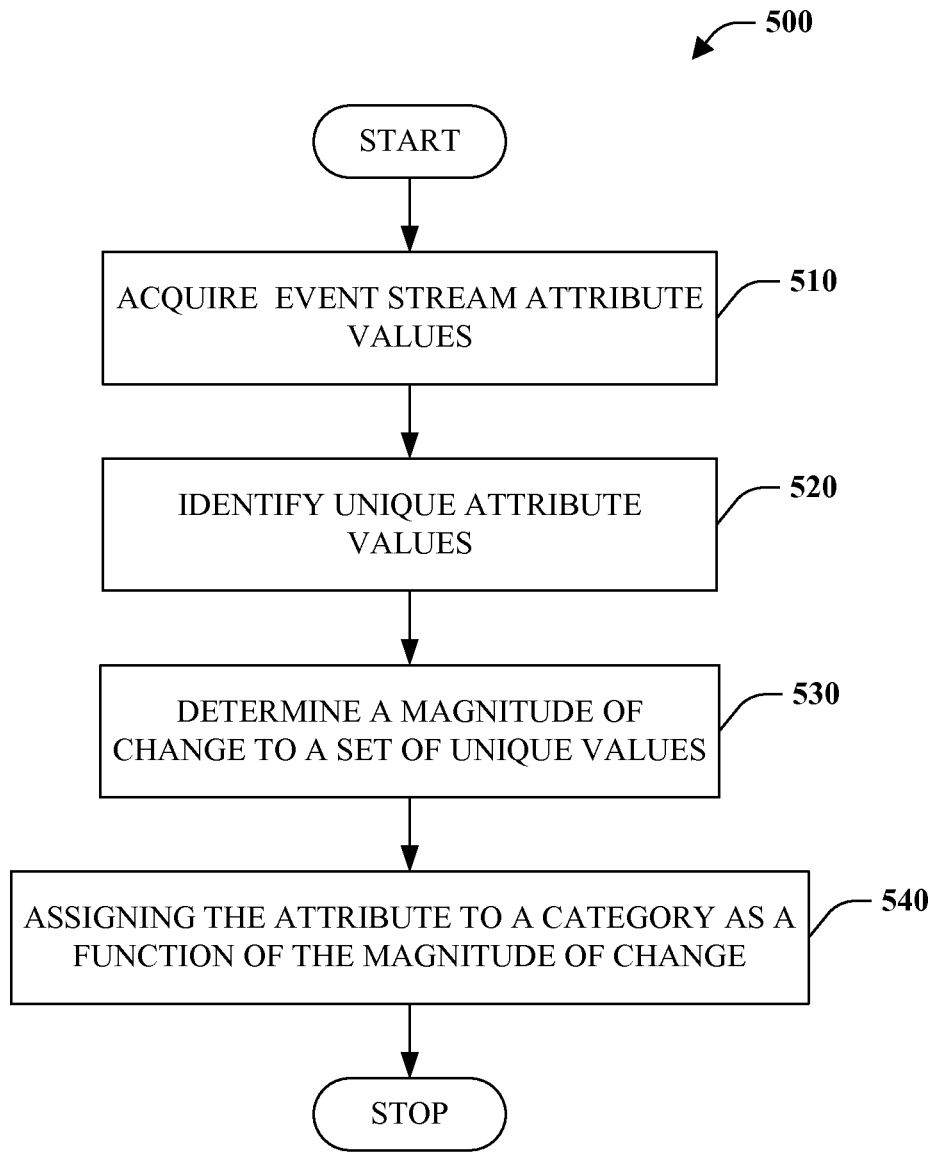
FIG. 5 is a flow chart diagram of event-stream attribute classification.

Referring to FIG. 5, a method 500 of event-stream attribute classification is illustrated. At reference numeral 510, event-stream attribute values are received, retrieved, or otherwise obtained or acquired. In one instance, the values can be obtained with respect to partitions corresponding to a time interval. At numeral 520, unique attribute values are identified. In other words, duplicate attribute values are removed leaving solely distinct values. At 530, a magnitude of change is determined for a set of unique values of an attribute. For example, it may be determined that the values are consistent or fixed, alternatively, it may be determined that the values are inconsistent or random. In accordance with one embodiment, the magnitude can be determined as a function of a number of unique values. At reference numeral 540, the attribute is assigned to a category or class as a function of the determined magnitude of change. Continuing with the above example, the attribute can be assigned one of two categories based on whether the magnitude of change is determined to be consistent or inconsistent. Of course, the magnitude of change need not be a Boolean choice between two values but rather it can be fuzzy such that there is a range of consistent or inconsistent, in which case there can be a plurality of categories or classes for which such data can be assigned.

Figure 6:
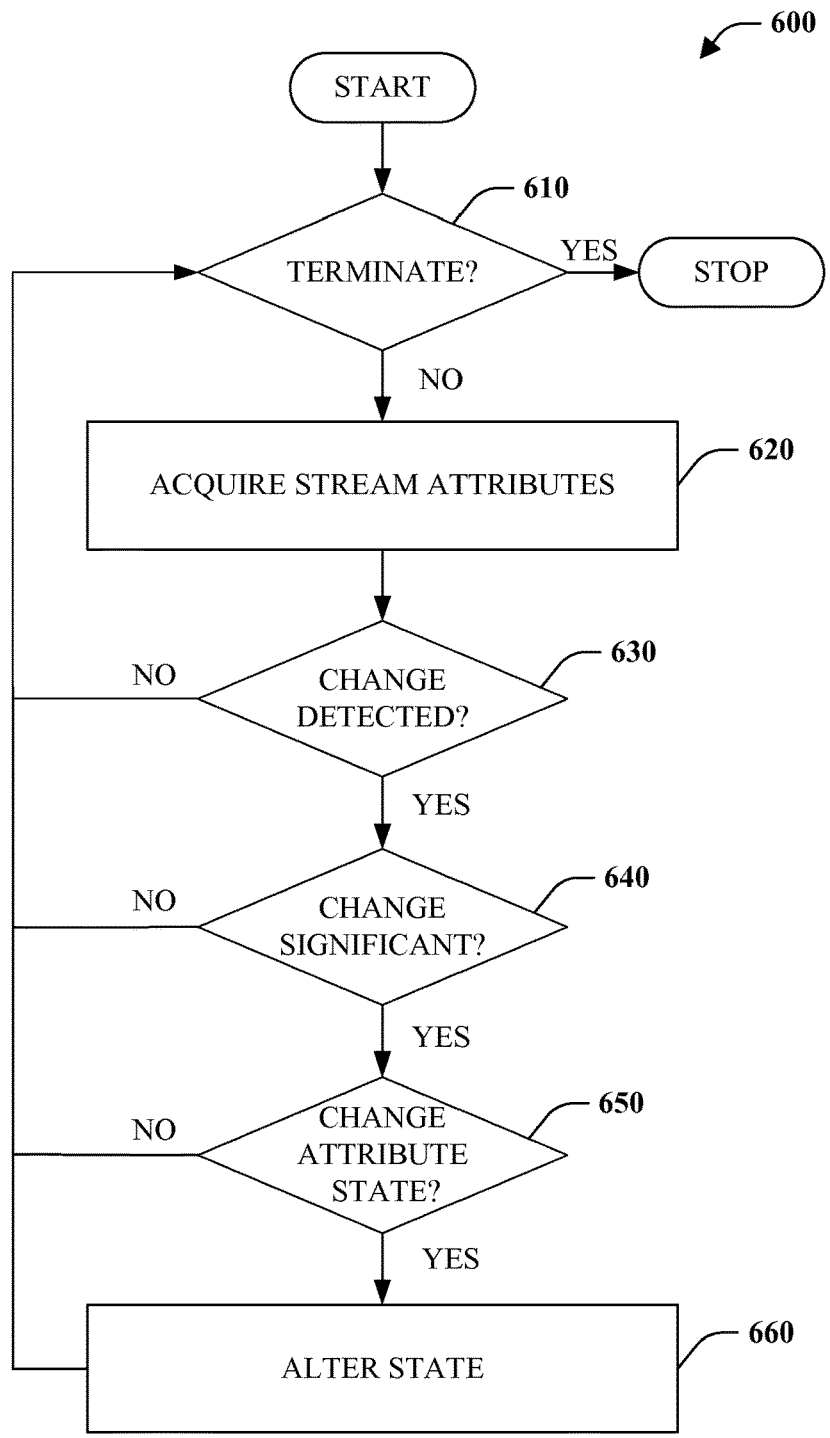
FIG. 6 is a flow chart diagram of state transition.

FIG. 6 depicts a method 600 of state transition. At reference numeral 610, a determination is made concerning whether to terminate the method. If the method is to be terminated ("YES"), the method is terminated. Otherwise ("NO"), the method continues at 620, where event stream attributes are acquired. At numeral 630, a determination is made concerning whether a change is detected. A change can correspond to a variation in a set of unique values associated with a particular attribute. If no change is detected ("NO"), the method continues at 610. If a change is detected ("YES"), a determination is made as to whether the change is significant. A test can be established to make such a determination for example based on a number of unique values associated with the attribute. If the change is insignificant ("NO"), the method continues at 610. If the change is deemed significant ("YES"), the method proceeds to 650 where a determination is made as to whether to alter the state of an attribute. The determination can be based on the current state of the attribute. For example, if the attribute's current state corresponds to a fixed set of unique values or an enumerated type, a decision can be made in light of a significant change to transition the current state to a different state associated with a non-enumerated type for example. However, if the attribute's state is currently associated with a non-enumerated type, the state need not be changed. If the state is not to be changed ("NO"), the method continues at 610. If the state is to be changed ("YES"), the state is altered at reference numeral 660, prior to continuing at numeral 610.

Figure 7:
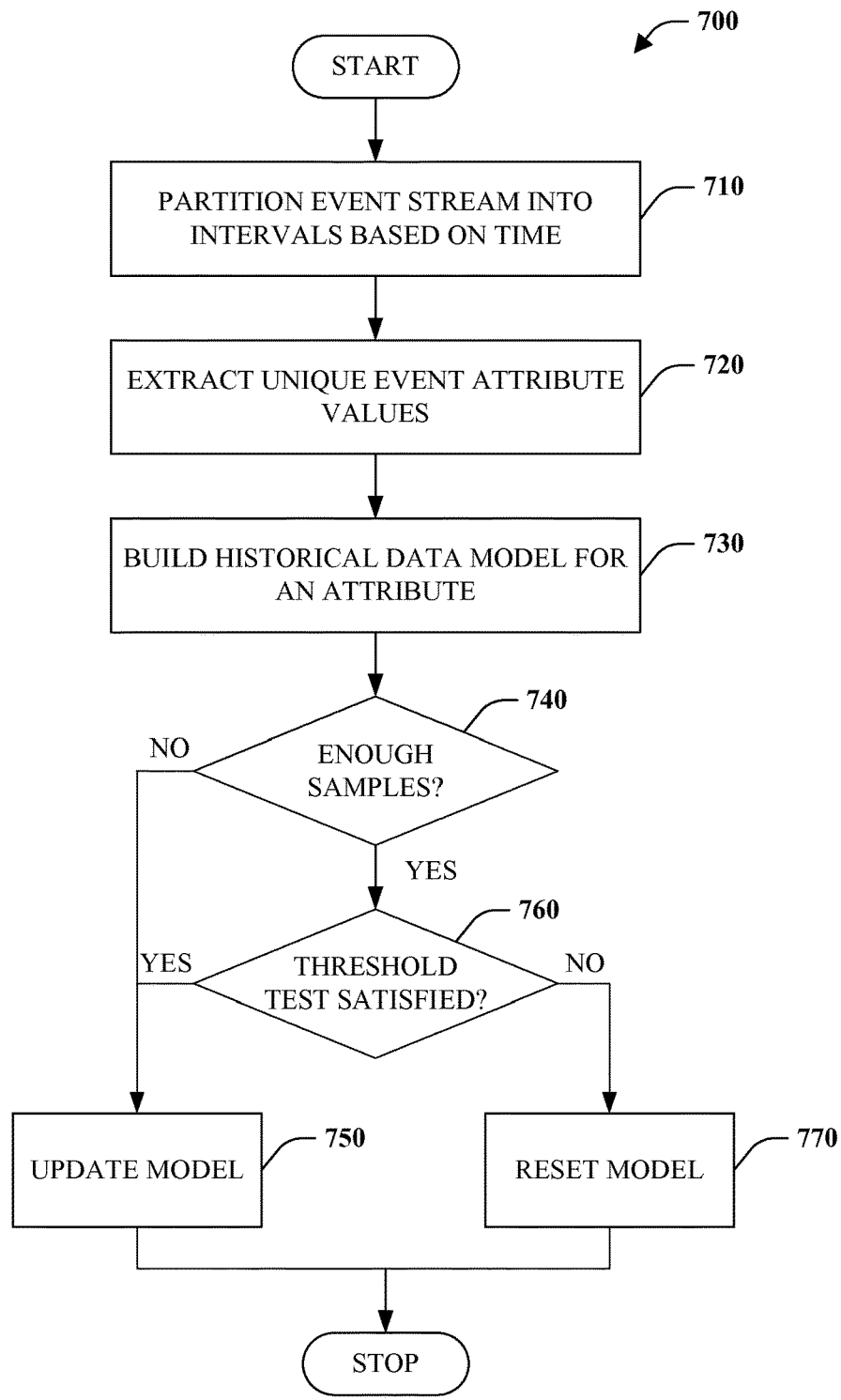
FIG. 7 is a flow chart diagram historical data model management.

FIG. 7 illustrates a method 700 of managing an historical data model associated with an attribute. At numeral 710, an event stream is partitioned into intervals based on time, such as "N"-minute intervals. At reference 720, unique event-stream attribute values are extracted. Stated differently, distinct values are identified and duplicate values are ignored. At reference numeral 730, an historical data model is built for an attribute. Such a data model can include a plurality of fields for recording, for instance, attribute state (e.g., Unknown, Enum, Non-Enum), unique attribute values, counts of the number of unique values identified per interval. At numeral 740, a determination is made as to whether enough samples have been acquired. Here, samples can correspond to intervals of attribute values. If not enough samples have been collected ("NO"), the data model can be updated with unique values and a count thereof associated with a current interval. If enough samples have been collected ("YES"), the method proceeds to 760 where a determination is made concerning whether a threshold test has been satisfied. The threshold test can compare absolute variance and/or relative variance of attribute counts over intervals against one or more configurable parameters to determine whether the attribute comprises statistically fixed unique values or, in other words, the attribute is a statistical enumerated type. If the threshold test is satisfied ("YES"), the historical model can be updated with current interval data at 750. However, if the threshold test is not satisfied ("NO"), the method continues at 770 where it resets the model prior to terminating. Resetting the model can correspond to clearing attribute values and counts, for example.

Figure 8:
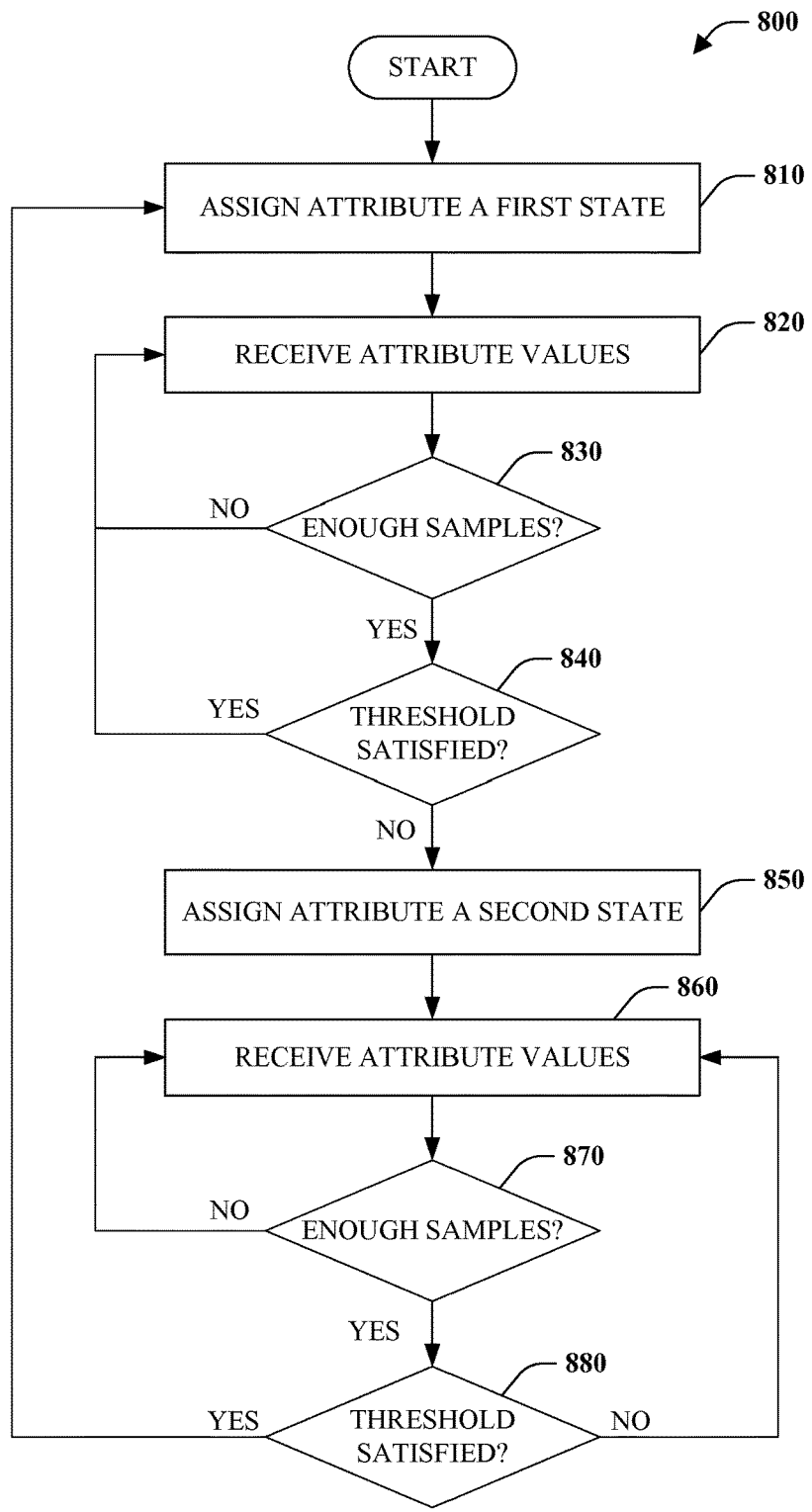
FIG. 8 is a flow chart diagram of a method of transitioning attribute states.

FIG. 8 depicts a method 800 of transitioning attribute states. At reference numeral 810, an attribute is assigned to a first state. For example, the first state can correspond to an enumerated type. At 820, attribute values are received or retrieved, for example associated with a predetermined time interval. A determination is made at numeral 830 concerning whether enough samples have been observed, for instance with respect to a specified minimum. Here, samples can correspond to intervals of attribute values. If not enough samples have been acquired ("NO"), the method continues at 820 where it receives addition attribute values. If enough samples have been acquired ("YES"), the method continues at 840, where a determination is made as to whether attribute data satisfies a threshold test. The threshold test can compare absolute variance and/or relative variance of attribute counts over intervals against one or more configurable parameters to determine whether the attribute comprises statistically fixed unique values. If the threshold test is satisfied ("YES"), the method continues at 820. If the threshold test is not satisfied ("NO"), the method proceeds to 850, where the attribute is assigned a second state. For example, the state can correspond to a non-enumerated type. At reference numeral 860, attribute values are again received or retrieved, for instance, associated with a predetermined time interval. At numeral 870, a determination is made as to whether enough samples, or intervals of data, have been acquired with respect to a predetermined minimum. If enough samples are not acquired ("NO"), the method continues to acquire attribute values at 860. If enough samples are acquired ("YES"), the method continues at 880 where a determination is made as to whether a threshold test is satisfied. The threshold test can be the same test with respect to numeral 840. At 880, if the threshold test is not satisfied ("NO"), the method continues at 860 where it receives attribute values. If the threshold test is satisfied at 880, the method proceeds to 810 where the attribute is assigned the first state. For example, the attribute can transition from a non-enumerated type to an enumerated type.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
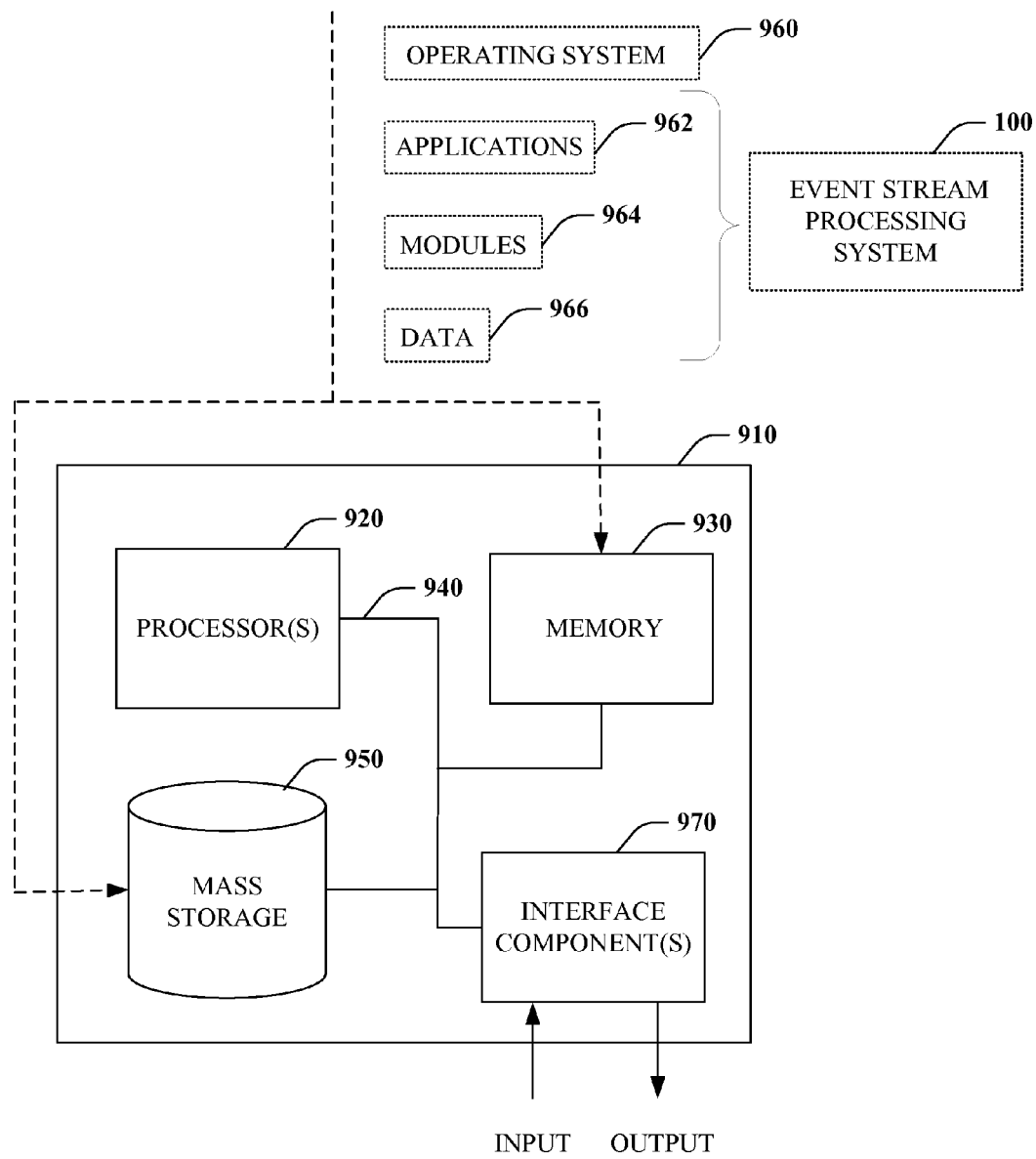
FIG. 9 is a schematic block diagram illustrating a suitable operating environment for aspects of the subject disclosure.

In order to provide a context for the claimed subject matter, FIG. 9 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 9, illustrated is an example general-purpose computer 910 or computing device (e.g., desktop, laptop, tablet, server, hand-held, programmable consumer or industrial electronics, set-top box, game system, compute node . . . ). The computer 910 includes one or more processor(s) 920, memory 930, system bus 940, mass storage 950, and one or more interface components 970. The system bus 940 communicatively couples at least the above system components. However, it is to be appreciated that in its simplest form the computer 910 can include one or more processors 920 coupled to memory 930 that execute various computer executable actions, instructions, and or components stored in memory 930.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration.

The computer 910 can include or otherwise interact with a variety of computer-readable media to facilitate control of the computer 910 to implement one or more aspects of the claimed subject matter. The computer-readable media can be any available media that can be accessed by the computer 910 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums which can be used to store the desired information and which can be accessed by the computer 910. Furthermore, computer storage media excludes modulated data signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 930 and mass storage 950 are examples of computer-readable storage media. Depending on the exact configuration and type of computing device, memory 930 may be volatile (e.g., RAM), non-volatile (e.g., ROM, flash memory . . . ) or some combination of the two. By way of example, the basic input/output system (BIOS), including basic routines to transfer information between elements within the computer 910, such as during start-up, can be stored in nonvolatile memory, while volatile memory can act as external cache memory to facilitate processing by the processor(s) 920, among other things.

Mass storage 950 includes removable/non-removable, volatile/non-volatile computer storage media for storage of large amounts of data relative to the memory 930. For example, mass storage 950 includes, but is not limited to, one or more devices such as a magnetic or optical disk drive, floppy disk drive, flash memory, solid-state drive, or memory stick.

Memory 930 and mass storage 950 can include, or have stored therein, operating system 960, one or more applications 962, one or more program modules 964, and data 966. The operating system 960 acts to control and allocate resources of the computer 910. Applications 962 include one or both of system and application software and can exploit management of resources by the operating system 960 through program modules 964 and data 966 stored in memory 930 and/or mass storage 950 to perform one or more actions. Accordingly, applications 962 can turn a general-purpose computer 910 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the event stream processing system 100, or portions thereof, can be, or form part, of an application 962, and include one or more modules 964 and data 966 stored in memory and/or mass storage 950 whose functionality can be realized when executed by one or more processor(s) 920.

In accordance with one particular embodiment, the processor(s) 920 can correspond to a system on a chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the event stream processing system 100 and/or associated functionality can be embedded within hardware in a SOC architecture.

The computer 910 also includes one or more interface components 970 that are communicatively coupled to the system bus 940 and facilitate interaction with the computer 910. By way of example, the interface component 970 can be a port (e.g., serial, parallel, PCMCIA, USB, FireWire . . . ) or an interface card (e.g., sound, video . . . ) or the like. In one example implementation, the interface component 970 can be embodied as a user input/output interface to enable a user to enter commands and information into the computer 910, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 970 can be embodied as an output peripheral interface to supply output to displays (e.g., CRT, LCD, plasma . . . ), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A computer-implemented method, comprising:
    employing at least one processor configured to execute computer-executable instructions stored in memory to perform the following acts:
        receiving a diagnostic event stream associated with a software application, wherein each event in the diagnostic event stream comprises an attribute and value of the attribute;
        identifying one or more unique values of the attribute from the diagnostic event stream, wherein the one or more unique values are non-duplicative;
        determining a count of the unique values;
        assigning the attribute to one of a plurality of categories based on variance in the count and one or more past counts of unique values; and
        presenting, on a display, the attribute based on the one of the plurality of categories assigned and
        generating at least one query suggestion based on the assignment of the attribute to the one of a plurality of categories for presentation on the display, the at least on query suggestion being associated with performance of diagnostics of the software application.

2. The method of claim 1, assigning the attribute to one of a first category corresponding to a fixed set of unique values or a second category corresponding to an unfixed set of unique values.

3. The method of claim 2 further comprising producing an alert, on the display, after the attribute is reassigned from the first category corresponding to the fixed set of unique values to the second category corresponding to the unfixed set of unique values.

4. The method of claim 2 further comprises presenting, on the display, an attribute assigned to the first category corresponding to the fixed set of unique values.

5. The method of claim 4 further comprises presenting, on the display, the attribute assigned to the first category as a query suggestion.

6. The method of claim 1, assigning the attribute to the one of the plurality of categories based on absolute and relative variance.

7. The method of claim 1 further comprises partitioning the diagnostic event stream based on a predetermined time interval.

8. The method of claim 7 further comprises identifying unique values for the attribute within a partition.

9. The method of claim 8 further comprises recording historical data and attribute category.

10. The method of claim 9 further comprises resetting the historical data upon a change in category assignment.

11. A system, comprising:
    a processor coupled to a memory, the processor configured to execute the following computer-executable components stored in the memory:
        a pre-process component configured to identify a count of unique values from a diagnostic event stream attribute associated with a software application, wherein the unique values are non-duplicative;
        an analysis component configured to determine if the attribute comprises a statistically fixed set of values based on variance in the count and one or more past counts of unique values; and
        a post-process component configured to present, on a display, an attribute that comprises the statistically fixed set of values and to generate at least one query suggestion based on the statistically fixed set of values, the at least one query being associated with performance of diagnostics of the software application.

12. The system of claim 11, the analysis component is further configured to determine if the attribute comprises the statistically fixed set of values as a function of a mean standard deviation of the past numbers of unique values.

13. The system of claim 11, the analysis component is further configured to determine if the attribute comprises the statistically fixed set of values as a function of a percent computed as mean standard deviation of the past numbers of unique values divided by mean of the past numbers of unique values.

14. The system of claim 11 further comprises a partition component configured to partition a diagnostic event stream associated with the diagnostic event stream attribute into segments that correspond to a predetermined time interval.

15. The system of claim 11 further comprises an extraction component configured to extract one or more unique values to extract one or more unique values of the attribute.

16. The system of claim 11 further comprises a model management component configured to manage a historical data model comprising unique attribute values, numbers of unique attribute values, and attribute state.

17. The system of claim 16 further comprises a state determination component configured to determine current attribute state based in part on the attribute state and the numbers of unique attribute values.

18. A computer-readable storage medium having instructions stored thereon that enable at least one processor to perform a method upon execution of the instructions, the method comprising:
    receiving a diagnostic event stream associated with a software application;
    identifying unique values for an attribute of the diagnostic event stream;
    determining a state of the attribute based on a past state, past counts of unique values per interval, and a number of unique values in a current interval, wherein state indicates whether the attribute is an enumerated type or a non-enumerated type;
    presenting, on a display, the attribute based on the type;
    generating at least one query suggestion based on whether the attribute is an enumerated type or a non-enumerated type, the at least one query suggestion being associated with performance of diagnostics of the software application.

19. The computer-readable storage medium of claim 18, the method further comprises clearing historical data including the past counts after transitioning from a first state indicating the attribute is the enumerated type to a second state indicating the attribute is the non-enumerated type.

20. The computer-readable storage medium of claim 18, the method further comprises producing an alert, on the display, after transitioning from a first state indicating the attribute is the enumerated type to a second state indicating the attribute is the non-enumerated type.

* * * * *